Patented June 8, 1943

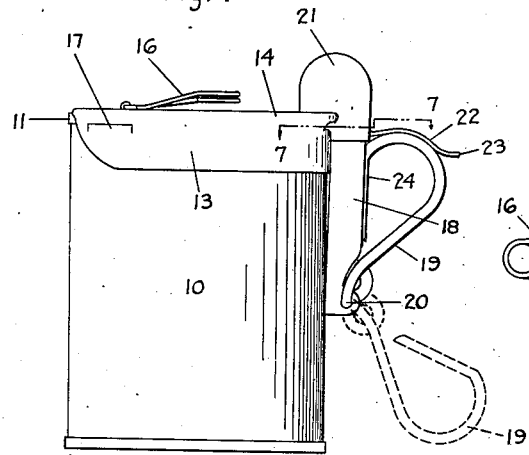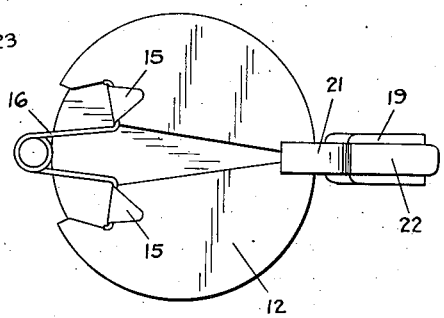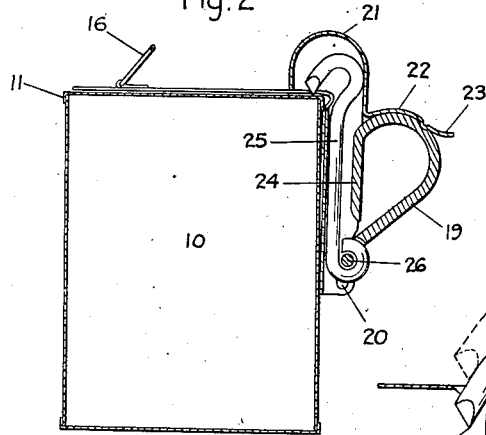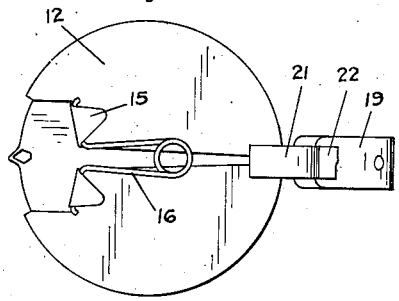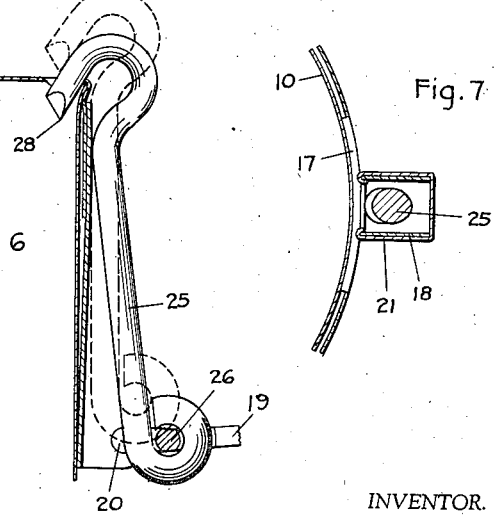

2,321,485

UNITED STATES PATENT OFFICE 2,321,485

CONDENSED MILK CAN OPENER AND HOLDER

Norman J. Harvey, Lincoln, Nebr.

Application October 16, 1939, Serial No. 299,673

3 Claims. (Cl. 220—51)

My invention relates to a device for holding a can of condensed milk or the like for opening the can and for holding the can while the contents are removed.

An object of the invention is the provision of a device which is designed for puncturing the top of the can at its periphery in a manner such that the puncture is made by distorting the metal at the seam to provide a spout for conducting the milk away from the side of the can.

Another object is the provision of a device for attachment to a can, the device having a prod for puncturing the can and having a pivoted handle for actuating the prod to and from puncturing position.

Another object is the provision of a device for dispensing the contents of a can containing a liquid, the device being adapted to be secured to the can and having a pivoted handle and a prod pivotally connected to the handle, the prod having a compound movement for first puncturing the top of the can and then distorting the metal of the can to provide a spout at the edge of the can.

Another object is the provision of a device which may be clamped to a can against any movement on the can and also against upward movement of displacement on the can.

Another object is the provision of a device adapted to be secured to the top of a can, the device including a downturned resilient flange for partly surrounding the upper portion of the can and including also means for tightening and loosening the flange for clamping and unclamping the device on the can.

Another object is the provision of a device for attachment to a can for convenience in handling the can while the contents are being dispensed, the device being particularly adapted to be attached to any of the cans of various diameters now on the market as condensed milk cans.

Another object is the provision of a holder for a can having one or more openings for dispensing the contents of the can, the holder being adapted to close the openings when the can is not in use to prevent the entrance of dust or other foreign matter.

Another object is the provision of a holder and opener for cans containing a liquid such as condensed milk, the device being simple of construction and in use, sanitary in use and between uses, and easily manipulated for providing apertures of effective size and with a spout in the can itself for pouring the milk as from a pitcher.

Having in view these objects and others which will be pointed out in the following description, I will now refer to the drawing, in which the device is shown in connection with a condensed milk can, and in which Figure 1 is a view in side elevation showing in dotted lines the position of the handle in its puncturing position.

Figure 2 is a vertical sectional view showing particularly the operating mechanism of the prod.

Figure 3 is a plan view showing the clamping parts in their releasing position from the milk can.

Figure 4 is a plan view showing the parts in their clamping position on the milk can and showing also the form of aperture in the milk can as formed by the prod.

Figure 5 is a vertical sectional view through the upper edge of the milk can with means for securing the device against release from the milk can.

Figure 6 is a vertical sectional view through the edge of the milk can, showing the movement of the prod in forming the aperture and spout in the milk can.

Figure 7 is a horizontal sectional view on the line 7—7 of Figure 1 looking in the direction of the arrows and showing particularly the position of the prod.

Cans for condensed milk differ from some other cans in that the top and bottom are provided with flanges which seat over the edges of the body portion of the can, solder being applied to the inner surfaces of the flanges to hermetically seal the can. In the drawing, the numeral 10 designates the can having flanges 11, the flanges having a slightly greater diameter than the body of the can. The edge of the top flange is utilized in securing my device in place on the milk can.

The base of my device includes a top member 12, a depending flange 13, and a bead 14 between the member 12 and the flange 13, the bead projecting laterally and being in arcuate form. The top member is cut away as shown, a triangular portion being cut out symmetrically with respect to the circle of the top. The edges of the two cuts converge and meet at the periphery of the top member 12 from whence they are continued in a single cut through the bead 14 at the handle end of the device. At the opposite end, the flange 13 as well as the member 12 and the bead 14 are cut. The member 12 thus consists of two parts which are joined together on a vertical line of the flange at the handle portion of the device, each part consisting of a sector-shaped top and a downturned flange. The material being resilient, this line constitutes a hinge for slightly increasing or decreasing the periphery of the member 12 to adapt the device to cans of various sizes.

For reasons which will subsequently be made evident, the member 12 must be adapted to be clamped very tightly on the milk can. The member 12 may readily be clipped onto the milk can due to the resilience of the flange. Referring now to Figures 3 and 4, it will be seen that a pair of ears 15 is found in the cut away portion of the member 12 and that the two ears are folded over on to the member 12 to form pivot sockets which are inclined with reference to each other as shown. The two pivot members project from a single lever 16. This lever is formed of resilient material and it is V-shaped, preferably with a loop at its apex. It has movement of about two quadrants as shown in Figures 3 and 4. The clamped position is shown in Figure 4 and the unclamped position is shown in Figure 3. When clamped about the upper edge of a milk can, the member 12 is tightly held in frictional engagement with the milk can.

For still further preventing accidental release, the flange 13 is provided with a plurality of slits, preferably three which are equidistantly spaced, and the upper portions of the tongues 17 thus formed are bent inwardly at a position such that the upper edges of the tongues bear against the lower edges of the flange 11 of the can.

The casing 18 is secured to depend from the flange 13 at the hinge thereof. This casing is in channel form, being open on its rear side. The handle member 19, in the form of a pitcher handle, is pivotally secured at 20 to the lower end portion of the casing 18 to have the pivotal movement indicated in full and dotted lines in Figure 1. The telescoping cap 21 rests over the upper end portions of the casing 18 to close the top of the casing and to provide a clip 22 for engaging the handle 19 to hold the handle in operative position as a handle, the clip having a thumb piece 23 at its extremity immediately above the handle. The handle terminates in an arm 24 which seats within the open channel of the casing 18 to constitute a closure for the casing when the handle is in its operative position as a handle.

In the channel of the casing 18 is a prod 25 for punching apertures in the top of the can. This prod is in the form of a hook which is pivotally secured at 26 to the handle 19 at a point a slight distance from the pivot 20. The movement of the handle 19 to and from its dotted line position of Figure 1 thus results in a compound movement of the point 28. The main component of this movement is vertical in its down and up direction but combined with this movement is a slight movement of the point 28 toward or away from the rim of the milk can. The end of the hook is bevelled at its sides to provide a sharp point and a knife edge so that the downward movement of the handle 19 will first cause the point 28 to penetrate the top of the milk can adjacent the edge and then press the rim of the can outwardly to provide an aperture with a spout as shown in Figure 4.

For use, the device in its Figure 3 position is pressed down against the top of a can of condensed milk or other liquid and the lever 16 is thrown to its Figure 4 position to clamp the device on the can. The handle 19 is then moved to its dotted line position of Figure 1 to puncture the top of the can. Reverse movement of the handle 19 releases the point of the prod from the aperture with the point entirely above the surface of the can so that movement of the lever 16 to its Figure 3 position will release the device for turning on the milk can. A second aperture may then be formed in the top of the milk can, both apertures being in close contiguity to the rim of the can. One of these apertures is to serve as an outlet for the milk while the other is the air inlet. The milk outlet is formed as shown in Figure 4 with a spout spaced from the rim to prevent the creeping of the milk down the side of the can. The air inlet may be made by depressing the lever handle either fully or partially since its purpose is only to admit air. The milk outlet must, however, be made by fully depressing the lever handle in order to make the aperture of adequate size and to provide the spout. When it is desired to increase the flow of milk from the can, all that is necessary is to punch two or more apertures spaced slightly from each other. From then on the device may be left in place until the contents of the can have been used. At the table, the can with the attached device serves as a pitcher for creaming the coffee or for otherwise utilizing the contents of the can, the handle 19 serving admirably as a pitcher handle and the spout in the can itself serving as a pitcher spout. Between uses while the milk can with its contents is stored, the device may be given a partial turn on the can to cover both apertures to protect the milk from dust and other foreign matter.

Having thus described my invention in such full, clear, and exact terms that its construction and operation will be readily understood by others skilled in the art to which it pertains, what I claim as new and desire to secure by Letters Patent of the United States is:

1. A device for opening and dispensing the contents of a can containing a fluid substance, said device including a member adapted to extend over the top portion of said can, means for clamping said member to said can, a handle normally extending upwardly along one side of the can and having its lower end pivotally secured to a downwardly extending portion of said member to permit said handle to be swung outwardly, means for resiliently and releasably retaining the other end of said handle adjacent said member to retain said handle in its normal position, a hook like prod with the point thereof adapted to project downwardly towards the top of the can closely adjacent the side thereof and with the shank thereof extending downwardly and pivotally connected at its lower end to the handle outwardly of the pivot point of said handle whereby upon said handle being swung downwardly, said prod is moved downwardly and outwardly to puncture the can at the edge thereof and deform the edge into a pouring spout.

2. In a device for dispensing a fluid substance from a can having an aperture adjacent the rim thereof, said device including a cap having two parts of sector-shaped cross-section, each part having a top portion and a down-turned flange of resilient material, the flanges being joined at one end to each other to connect the parts together, clamping means for drawing the two parts of the cap into clamping engagement with the can, said clamping means including misaligned pivots on the two portions of the top of said can and a resilient connection between said pivots, and a pitcher handle secured to said cap adjacent the junction of the flanges of the two parts.

3. A device of the class described including a cap adapted to rest over the top of a can containing a fluid substance, clamping means for clamping said cap to the can, a handle secured to the side of said cap in such a manner as to extend adjacent the side of the can to which the cap is applied and form a supporting handle for the cap and can, said handle having its lower end pivotally secured to said cap so as to permit said handle to be swung outwardly, a prod for penetrating the top of the can, connections between said handle and said prod for moving said prod downwardly into the top of said can as said handle is swung away from its normal position adjacent the side of the can, and an auxiliary cap member secured to said previously named cap and extending over said prod, said auxiliary cap member being provided with an extension in the form of a clip for releasably holding said handle in said normal position.

NORMAN J. HARVEY.